United States Patent [19]

Kaar

[11] Patent Number: 4,614,102
[45] Date of Patent: Sep. 30, 1986

[54] SEAM LOCK SPREADER MOUNTED ON LOCK-SEAM MACHINE BASE

[76] Inventor: Richard A. Kaar, 551 W. 1st St., Wahoo, Nebr. 68066

[21] Appl. No.: 757,722

[22] Filed: Jul. 22, 1985

[51] Int. Cl.$^4$ .............................................. B21B 5/08
[52] U.S. Cl. ............................................. 72/178; 72/211
[58] Field of Search ............... 72/108, 109, 110, 177, 72/178, 179, 211

[56] References Cited

U.S. PATENT DOCUMENTS 2,146,659  2/1939  Steward ................................ 72/211
2,334,407 11/1943  Grebe .................................. 72/109
2,479,200  8/1949  Birks ................................... 72/178
3,299,680  1/1967  Thompson ........................... 72/109

Primary Examiner—Gilden: Leon
Attorney, Agent, or Firm—Hiram A. Sturges

[57] ABSTRACT

A seam lock spreader formed by providing a spreader wheel carrier adjustably attachable to the spindle of a conventional combination rotary machine and attaching also to the machine a pair of rollers especially shaped for driving sheet metal while providing a space for receiving its seam. The rollers are of a special size for fitting the combination rotary machine.

1 Claim, 13 Drawing Figures

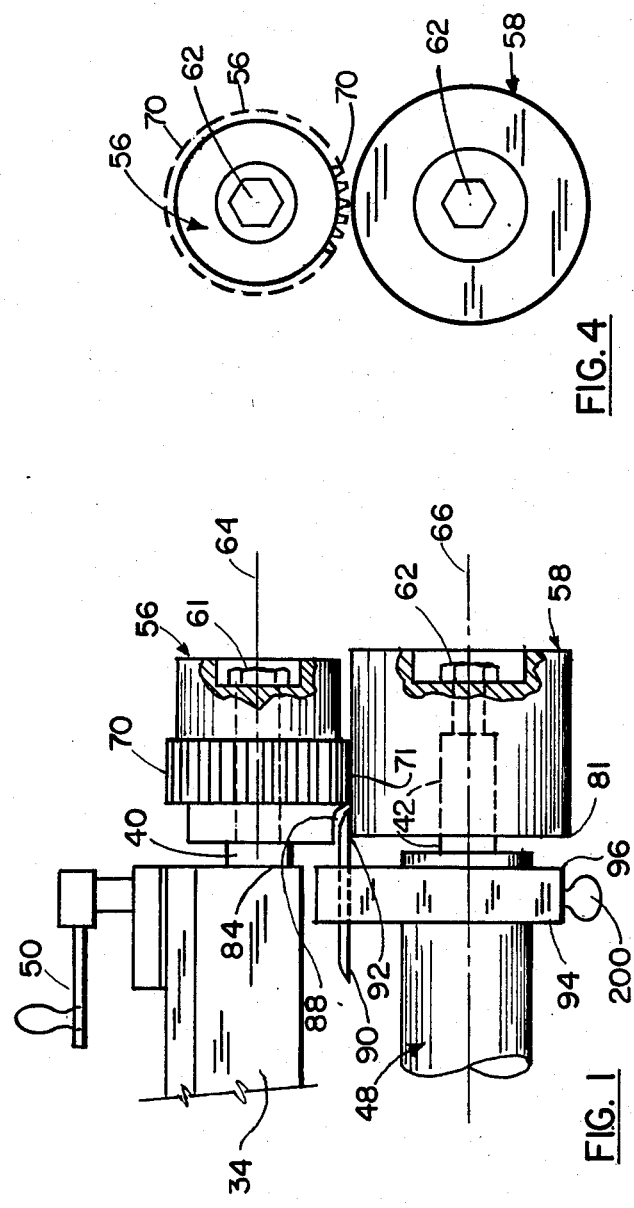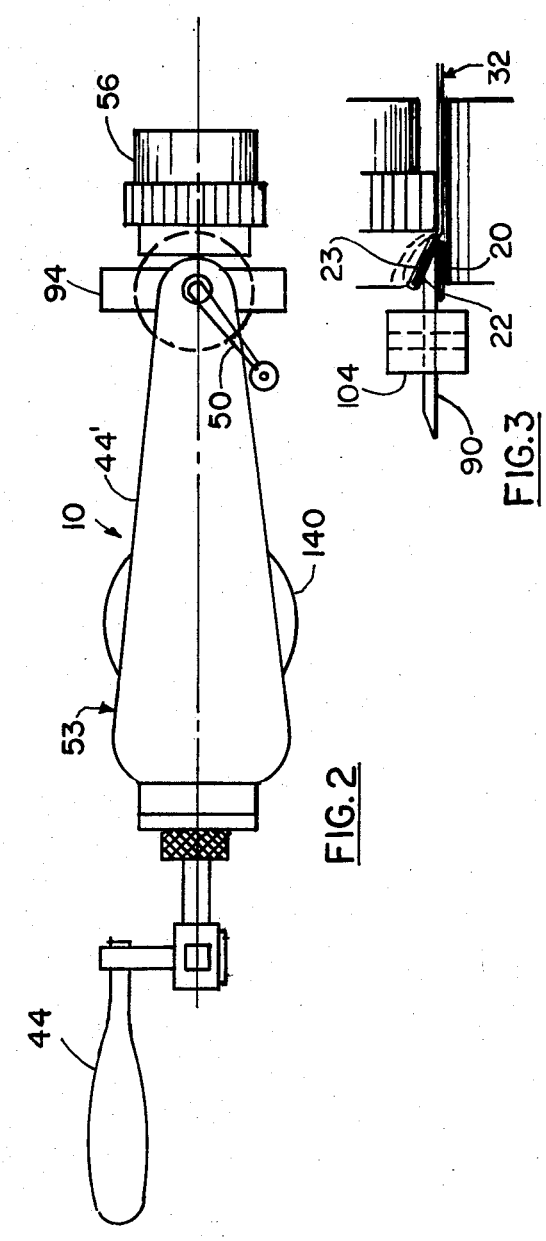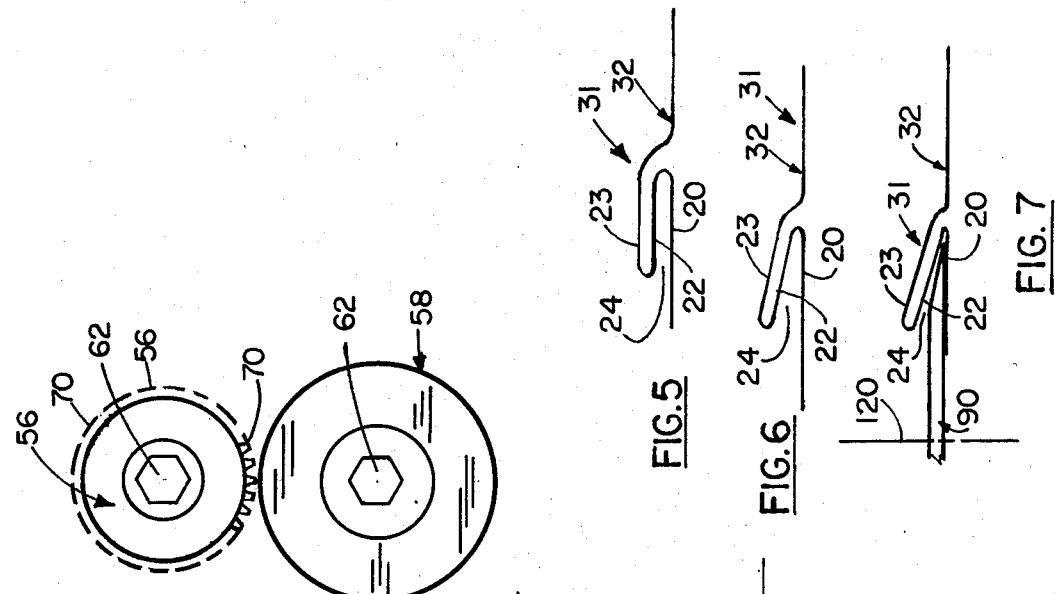

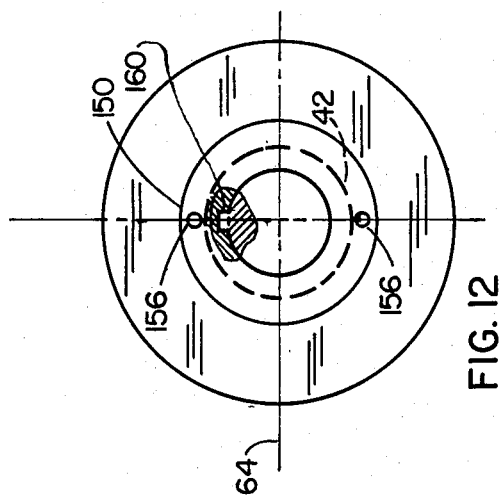
FIG. 12
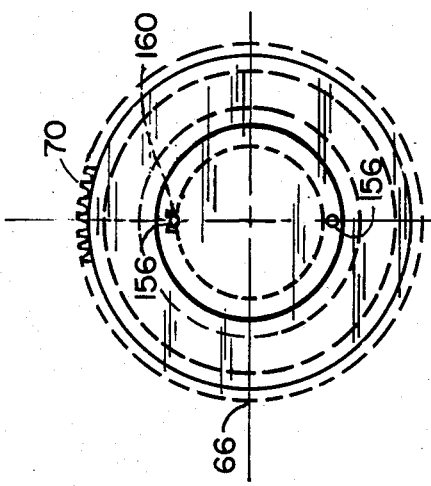
FIG. 13
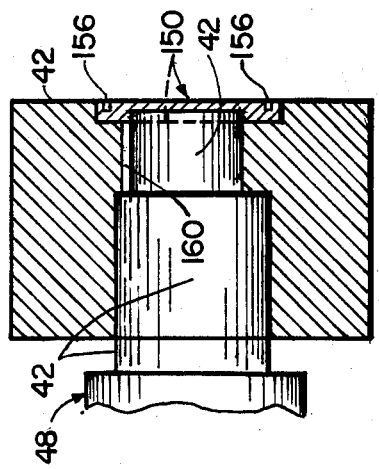
FIG. 10 LOWER ROLLER
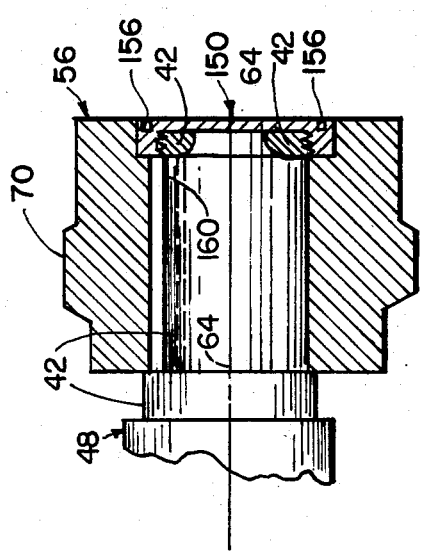
FIG. 11 UPPER ROLLER
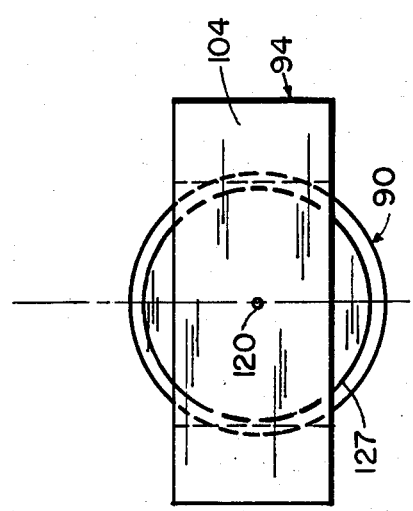
FIG. 8
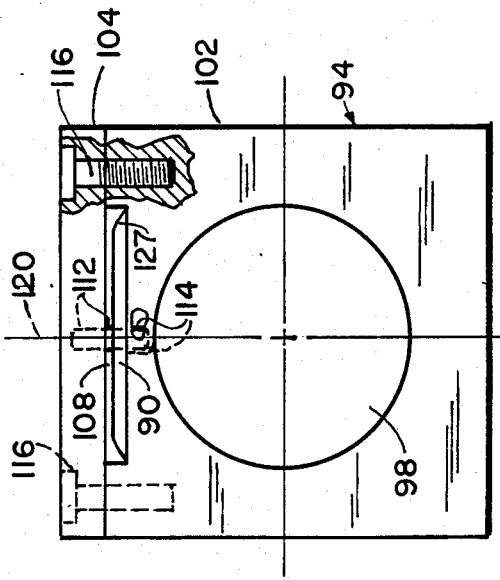
FIG. 9

SEAM LOCK SPREADER MOUNTED ON LOCK-SEAM MACHINE BASE

BACKGROUND OF THE INVENTION

In the prior art combination rotary machines for sheet metal bending have long been in use. They comprise upper and lower rollers spaced close enough together to press on upper and lower sides of a piece of sheet metal to cause it to move through the space between the rollers. There are many thousands of such machines in use and special sets of rollers are available for making seams which have been primarily the seams of the type of the Pittsburgh lock seam, although for a period of approximately 15 years another kind of roller for making seams called a button lock seam have been on the market.

These types of seams have an elongated pocket into which the edge of another piece of metal is to be inserted in making a joint.

It has been necessary, in all sheet metal shops that I have been in, or heard of, that great manual labor be involved in the use of a screwdriver driven by a hammer to wedge apart the very close side walls of the elongated pocket or crevice.

Taking great time and with much manual labor, at expensive skilled tradesman's wages, workmen drive the screwdriver into the pocket, pry the pocket walls apart, then reinsert the screwdriver into the pocket a little further along the pocket and pry again. It is a slow, tedious, boring job. It produces a crude result because of the uneven appearance of the metal being bent in the points where the screwdriver has been inserted.

Machines have been made to eliminate much of this hand-labor by using a spreading disc or a spreading wheel mounted on a costly special frame to engage in the elongated crevice or pocket of the seam as sheet metal is rotated between rollers to propel it past the spreading wheel. One such machine was proposed in a U.S. Pat. No. 2,146,659, issued Feb. 7, 1939, to A. A. Stewert, entitled: SEAM PRECISION TOOL.

A second proposal is found in U.S. Pat. No. 2,334,407 issued Feb. 16, 1943, to C. H. Grebe, titled: LOCK OPENER, also having a costly special frame.

A third proposal of such a machine is to be found in U.S. Pat. No. 2,479,200, issued Aug. 16, 1949 to W. Birks, and titled: APPARATUS FOR OPENING SHEET METAL SEAM LOCKS.

The Birks machine, like those of Stewert and Grebe, also required a special frame. This meant that these machines represented a complete and full investment, whereas it is an object of this invention to provide a way to mount the spreading wheel on a carrier which is able to fit the horizontal spindle of a common combination rotary machine. Such spindles extend horizontally beneath and spaced from an upper part of the frame of such machines.

Because combination rotary machines for making seams are used in heavy sheet metal bending shops as a basic tool, therefore, this invention makes it possible to make use of the many, many thousands of these machines for the purpose of seam lock spreading so as to eliminate the need for handbending by a screwdriver.

An objective is to provide a seam lock opening machine which makes use of the great investment in combination rotary machines that has already been made so as to provide fast seam opening at the cost of purchase of only two special rollers and a spreading wheel carrier.

Another objective is to provide a machine that can be easily adjusted and that is of strong and durable construction for heavy-duty work. This is important because experiment with the Birks machine in my own shop has shown me that it has been easier to use a screwdriver, even though screwdriver seam opening is slow and very tiring, becoming slower and slower as the arms and hands become more and more fatigued, easier, that is, except on very thin sheet metal.

It is because of the above stated disadvantages of the Birks machine that I have found that none of them are to be found in the sheet metal bending shops that I have known, with the exception of the Birks machine that has been unused in my shop for many years except on very light metal.

A further object. is to provide roller and spreader carrier adaptation for existing combination rotary machines. which will not only open a Pittsburgh seam lock, but will also open a button lock.

BRIEF DESCRIPTION OF THE DRAWINGS

FIG. 1 is a side elevation of a forward portion of a combination rotary machine shown as converted to become the lock seam spreader of this invention, portions of special rollers thereon being broken away.

FIG. 2 is a top plan view of the entire lock seam spreader hereof shown drawn on a smaller scale than FIG. 1.

FIG. 3 is a forward end view of the upper roller of FIG. 1.

FIG. 4 is a forward end view of the lower roller of FIG. 1.

FIG. 5 is an edge view of a work-piece having a Pittsburgh seam formed therein with the seam in a tight position.

FIG. 6 is an end view of the seam of FIG. 5 but with the wings of its receiving pocket spread apart as they would be at the completion of application of this machine to the work-piece.

FIG. 7 is a view similar to FIG. 6 but showing also the spreader wheel of this invention in position for opening the machine.

FIG. 8 is a top plan view of the spreader wheel carrier hereof.

FIG. 9 is a frontal elevation of the spreader wheel carrier hereof with one bolt shown in dotted lines and a portion of the carrier broken away to show the other one of the bolts of the carrier.

FIGS. 10 and 11 are side elevation views of the lower roller and upper rollers respectively with closer half portions removed.

FIGS. 12 and 13 are end views of the lower and upper rollers respectively.

DESCRIPTION OF THE PREFERRED EMBODIMENTS

The seam lock spreader hereof is generally shown at 10 in FIG. 2. It is for spreading apart the wings 20 and 22 of the elongated receiving pocket 24 in a seam lock 30 in a work-piece of sheet metal 32 shown in FIGS. 5, 6, and 7.

The spreader 10 has certain parts that are common to the prior art combination roller machines such as the machines known as the Pexto machine and the Niagara machine and the Tennsmith machine.

The Pexto machine, without the rollers it usually has for other purposes, is shown in FIGS. 1 and 2 at 33, for purposes of illustration. The shape and dimensions of parts of the three prior art combination rotary machines vary somewhat but the principles of each are the same. The hand crank shown at 33, which when rotated, causes the shafts 40 and 42 to rotate in opposite directions.

An elongated spindle 48 forms a fixed part of the main frame 44 and is disposed around and rotatably receives the lower rotating shaft 42.

A common combination roller machine such as shown at 33 has a crank 50 for adjusting the upper shaft 40 upwardly or downwardly. Such upper and lower rollers 56 and 58 are removably fixed to the shafts 40 and 42 by upper and lower nuts 61 and 62 respectively, whereby the upper and lower rollers 56 and 58 are closely spaced for pressing against the work-piece 32 of sheet metal which passes therebetween.

The upper roller 56 has an outermost portion 70 spaceed farthest from its axis 64 and the portion 70 has an exterior of substantially cylindrical shape and has horizontally extending teeth or knurling 71 parallel to the axis 64.

The lower or other roller 58 is cylindrical on its exterior and can be smooth. It has a frame side 78 having a circular edge 81 concentric about its axis 66.

The outermost portion 70 of the upper roller 56 is spaced along the axes 64 and 66 from the adjacent upper part 84 of the main frame 34 farther than the circular side edge 81 of the lower roller 58 is spaced so as to provide a workpiece and spreading wheel receiving space between the upper and lower rollers and is located between the outermost portion 70 of the upper roller 56 and the frame side edge 81 of the lower roller 58.

A spreading wheel 90 is provided having a circular marginal edge 92 partially disposed in the spreading wheel receiving space 88. The spreading wheel 90 is mounted in a spreading wheel carrier 94 having a spreader frame 96 provided with an opening 90 therethrough for slidably and closely receiving the spindle 48. The opening 98 is cylindrical in shape.

The spreader frame 96 has a lower portion 102 and an upper portion 104. The upper side of the lower portion 102 has a notch 108 therein extending downwardly from its upper side and having a horizontal lower wall 110. The notch 108 is large enough to receive the spreading wheel 90 as it rotates about its axle 112, which latter has its lower end in a socket 114 in the upper side of the lower frame portion 102.

The upper frame portion 104 bridges across the upper side of the notch 108 and is secured by bolts 116 to the lower portion 102.

The upper portion 104 also receives the upper part of the spreader axle 112, whereby the spreading wheel 90 rotates about a vertical axis 120.

The spreading wheel 90 has a circular marginal portion 127 which tapers to a lesser thickness at its outer edge, as seen in side elevation in FIGS. 1 and 9, as its edge 122 is approached from its axis 120.

The spindle 48 has a cylindrical exterior surface 128 which is parallel with the axes 64 and 66.

The spreading wheel carrier 94 has a spindle-receiving opening 132 which has a cylindrical wall 136 parallel to the axis 66 which extends through the center of the spindle.

The nut shown in FIG. 10 can be optionally used in place of the polygnal nuts 61 and 62 shown in FIG. 1.

In FIGS. 10 and 11 the lower and upper rollers 56 and 58 are shown with closer half portions removed and the remainder shown in section with the shaft having thereon lower and upper nuts 150 of the conventional type used in the prior art, each having two recesses 156 therein for receiving the nibs of the special wrench not shown. Each roller 56 and 58 is fixed to its shaft 40 or 42 also by means of a key assembly 160.

A setscrew 200 releasably fixes the carrier on the spindle 48.

I claim:

1. A seam lock spreader for spreading apart the wings of the elongated receiving pocket in a seam lock comprising: a main frame, upper and lower shafts rotatably mounted on and projecting to one side of said main frame, a crank handle at the opposite end of said main frame, means drivably connecting said crank handle and said shaft whereby said crank handle drives said shaft, upper and lower rollers on said shafts respectively whereby said upper and lower rollers rotate in opposite directions about upper and lower axes whereby said rollers are closely spaced for pressing against a work-piece of sheet metal passing therebetween, one of said rollers having an outermost portion having an exterior of substantially cylindrical shape, said one roller having a section of lesser diameter disposed between said outermost portion and a frame side of said one roller for creating a space for receiving the seam portion of a workpiece therein, the other of said rollers having a shape permitting said workpiece seam portion to be received in said space at times when the exterior of said other roller is close enough to said one roller that the sheet metal work-piece disposed between the two rollers will be driven tangentially of said rollers, a spreading wheel having an exterior marginal edge portion partially disposed in said spreading wheel receiving space, a spreading wheel carrier having a vertical axle rotatably carrying said spreading wheel for rotation only about a vertical axis, said spreading wheel having its circular marginal portion tapering as seen in side elevation to a lesser thickness as its edge is approached from its axis, said main frame having a fixed horizontally elongated spindle surrounding said lower shaft and having exterior surfaces parallel with said roller axes, said spreading wheel carrier having a spindle-receiving opening therethrough and receiving said spindle so that said carrier is slidable along said spindle and adjustably positionable along said spindle, means for fixing said carrier in a desired position on said spindle, at least one of said rollers being knurled on that portion thereof which is spaced farthest from the respective axis.

* * * * *